United States Patent
Hansen et al.

(10) Patent No.: US 10,302,027 B2
(45) Date of Patent: May 28, 2019

(54) VARIABLE ENGINE SPEED CONTROL

(71) Applicant: Clark Equipment Company, West Fargo, ND (US)

(72) Inventors: Ronald S. Hansen, Leonard, ND (US); Christopher L. Young, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 21 days.

(21) Appl. No.: 15/476,437

(22) Filed: Mar. 31, 2017

(65) Prior Publication Data

US 2017/0284316 A1   Oct. 5, 2017

Related U.S. Application Data

(60) Provisional application No. 62/316,995, filed on Apr. 1, 2016.

(51) Int. Cl.
*E02F 3/32* (2006.01)
*E02F 3/34* (2006.01)
(Continued)

(52) U.S. Cl.
CPC .............. *F02D 29/04* (2013.01); *E02F 3/325* (2013.01); *E02F 3/3414* (2013.01); *E02F 3/401* (2013.01); *E02F 9/024* (2013.01); *E02F 9/2004* (2013.01); *E02F 9/2062* (2013.01); *E02F 9/2066* (2013.01); *E02F 9/2232* (2013.01); *E02F 9/2246* (2013.01); *E02F 9/2271* (2013.01); *F02D 29/02* (2013.01); *F15B 11/08* (2013.01); *F15B 21/08* (2013.01); *B62D 11/02* (2013.01);
(Continued)

(58) Field of Classification Search
CPC ..... E02F 9/2246; E02F 9/2271; E02F 9/2232; E02F 9/2062; E02F 9/2004; E02F 9/024; E02F 3/401; E02F 3/414; E02F 3/325; E02F 9/2066; E02F 9/2292; E02F 9/16; F15B 21/08; F15B 11/08; F15B 2211/20523; F15B 2211/275; F02D 29/04; F02D 29/02; B62D 11/02
See application file for complete search history.

(56) References Cited

U.S. PATENT DOCUMENTS 3,323,607 A   6/1967   Futamata
3,625,302 A   12/1971  Lauck
(Continued)

FOREIGN PATENT DOCUMENTS

EP   1650418 A1   4/2006
EP   2090700 A1   8/2009

OTHER PUBLICATIONS

International Search Report and Written Opinion dated Jun. 30, 2017 for International Application No. PCT/US2017/025492 filed Mar. 31, 2017, 11 pages.

*Primary Examiner* — Hussein Elchanti
(74) *Attorney, Agent, or Firm* — John D. Veldhuis-Kroeze; Westman, Champlin & Koehler, P.A.

(57) ABSTRACT

Power machines, control systems and methods that adjust engine speed based upon actuation of user input controls that control other power machine functions such as travel functions and lift arm functions. By controlling engine speed at least partially in response to the user input devices controlling other machine functions, more optimal engine speeds can be achieved.

15 Claims, 12 Drawing Sheets

(51) Int. Cl.
  *E02F 3/40* (2006.01)
  *E02F 9/02* (2006.01)
  *E02F 9/16* (2006.01)
  *E02F 9/20* (2006.01)
  *E02F 9/22* (2006.01)
  *F02D 29/04* (2006.01)
  *F02D 29/02* (2006.01)
  *F15B 11/08* (2006.01)
  *F15B 21/08* (2006.01)
  *B62D 11/02* (2006.01)

(52) U.S. Cl.
  CPC .............. *E02F 9/16* (2013.01); *E02F 9/2292* (2013.01); *F15B 2211/20523* (2013.01); *F15B 2211/275* (2013.01)

(56) References Cited

U.S. PATENT DOCUMENTS

| | | | |
|---|---|---|---|
| 4,036,321 A | 7/1977 | Habiger | |
| 4,699,239 A | 10/1987 | Ishino et al. | |
| 4,796,736 A | 1/1989 | Fee et al. | |
| 4,798,099 A | 1/1989 | Alexander et al. | |
| 5,042,314 A | 8/1991 | Rytter et al. | |
| 6,148,939 A | 11/2000 | Brookhart et al. | |
| 6,328,127 B1 | 12/2001 | Hori et al. | |
| 6,435,289 B1 | 8/2002 | Hori et al. | |
| 6,601,670 B2 | 8/2003 | Kaneda et al. | |
| 7,273,125 B2 | 9/2007 | Schuh | |
| 7,334,658 B2 | 2/2008 | Berg et al. | |
| 7,409,879 B2 | 8/2008 | Glatz | |
| 7,641,019 B2 | 1/2010 | Pline | |
| 7,857,085 B2 | 12/2010 | Spark | |
| 8,403,089 B2 | 3/2013 | Braun et al. | |
| 9,004,218 B2 | 4/2015 | Gulati et al. | |
| 9,695,571 B1* | 7/2017 | Ge | E02F 3/431 |
| 9,969,402 B2* | 5/2018 | Goli | B60W 10/06 |
| 2011/0320095 A1* | 12/2011 | Anderson | B60W 10/06 701/54 |
| 2014/0174066 A1 | 6/2014 | Schulte et al. | |
| 2014/0244117 A1 | 8/2014 | Wu et al. | |
| 2016/0215480 A1* | 7/2016 | Ishihara | E02F 9/2075 |
| 2016/0230369 A1* | 8/2016 | Kaneko | B60K 6/46 |

* cited by examiner

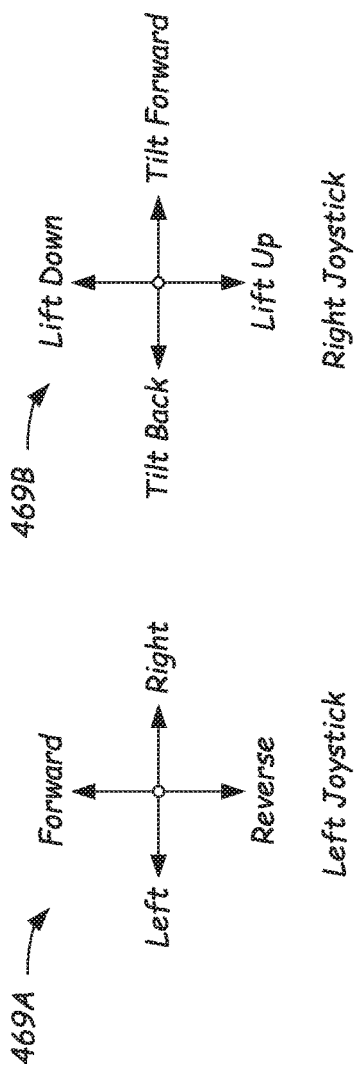
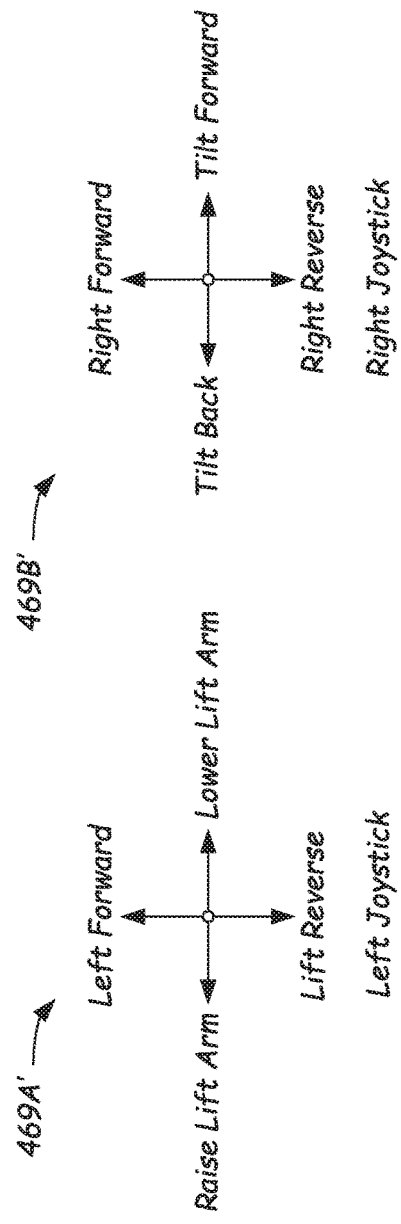

VARIABLE ENGINE SPEED CONTROL

CROSS-REFERENCE TO RELATED APPLICATION

This application claims the benefit of U.S. Provisional Application No. 62/316,995, which was filed on Apr. 1, 2016.

BACKGROUND

This disclosure is directed toward power machines. More particularly, this disclosure is related to control of engine throttle in power machines. Power machines, for the purposes of this disclosure, include any type of machine that generates power for accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples. While the following discussion is provided in the context of loader type power machines and work vehicles, the discussion is not intended to be limited to loaders.

Operators of loaders, including skid steer loaders and track loaders, are required to control different machine functions simultaneously, using hand and/or foot controls. Machine functions which must typically be controlled include forward and reverse travel, turning/steering, travel speed, lift arm actuation (lift) through actuation of a lift cylinder, bucket or implement orientation (tilt) through actuation of a lift cylinder, and auxiliary functions such as those associated with an attached implement. For example, using a joystick control pattern referred to as an "ISO pattern", the right-hand joystick controls lift functions (fore-aft movement of the joystick) and tilt functions (side-to-side movement of joystick), and the left-hand joystick controls forward and reverse travel and turning. Using an alternative joystick control pattern referred to as an "H pattern", the left joystick is used to control the left-side drive functions (forward and reverse movement and speed of left side tractive elements) and lift functions, while the right joystick is used to control the right-side drive functions (forward and reverse movement and speed of right side tractive elements), tilt functions, and auxiliary hydraulic functions. Other patterns can be used.

While controlling the above-discussed functions with a pair of joystick controls, an operator of some types of loaders must typically use a foot pedal or other user input device to control an engine operating speed, referred to more simply as "engine speed", using the foot pedal to vary the speed of the engine as may be advantageous during the operation of the loader. Such foot pedals are often biased to a minimum engine speed setting, requiring the operator to engage the foot pedal to provide more than a minimum amount of engine speed. That is, these types of foot pedals are momentarily activated devices. Alternatively or in addition, a baseline throttle input that can be set to any engine speed setting in the engine's operation range can be employed to adjust the minimum amount (or simply set the engine speed when no momentary input such as the foot pedal discussed above is available). Because these inputs are manually controlled, even a skilled operator may command more or less throttle speed than is optimal, resulting in increased fuel usage or inadequate power delivery.

To ensure that the engine is operating at a high enough engine speed, referred to as rotations per minute (RPM), to sufficiently power the hydraulic systems to perform the above-mentioned work functions, it is common for an operator to use a baseline throttle input to set the engine speed to a high RPM level, and to leave the engine at this level while performing various tasks requiring user input device manipulation to control forward and reverse travel, travel speed, turning, lift arm function, tilt function, and auxiliary functions. Since the high RPM level is not typically required at all times while performing these functions, this practice results in the use of more fuel than is required, creates more wear on the engine than is required, and creates more noise than is required. In the alternative, if the operator uses the throttle input to set the engine speed to a low RPM level, the machine may be underpowered when attempting to perform these functions, resulting in poor performance, engine stalls, and the like.

The discussion above is merely provided for general background information and is not intended to be used as an aid in determining the scope of the claimed subject matter.

SUMMARY

Disclosed are power machines, control systems and methods which automatically control engine speed based upon user inputs which control other power machine functions such as travel functions and lift arm assembly position control functions. By automatically controlling engine speed at least partially in response to the user input devices controlling other machine functions, more optimal engine speeds can be achieved.

In one embodiment, a power machine is disclosed. The power machine has a frame, a tractive element operably coupled to the frame, a work element operably coupled to the frame, an engine mounted to the frame, and a control system for controlling operation of the tractive element, work element, and engine. The engine provides a source of power to the tractive element and the work element. The control system includes a first user input capable of being manipulated to provide a signal indicative of an intent to control the tractive element, a second user input, capable of being manipulated to provide a signal indicative of an intent to control the work element, and a controller for providing a control signal to control an engine operating speed. The controller is in communication with the first and second user inputs to receive the signals from the first and second user inputs and determines a desired engine operating speed based on a baseline engine operating speed and a calculated offset. The offset is based at least in part on at least one of the signal from the first user input and the signal from the second user input. The controller provides a control signal to the engine based on the determined desired engine operating speed.

In another embodiment, a method of controlling operation of a power machine having an engine, a drive system including a hydraulic pump and a hydraulic motor, and a lift arm assembly is disclosed. The method includes receiving a signal from one of a first input device indicative of an intent to cause the power machine to drive over a support surface and a second input device indicative of an intent to move the lift arm assembly. An engine operating speed offset is calculated based on the received signal from the one of the first input device and the second input device. The offset is added to a baseline engine operating speed to establish a desired engine operating speed. The method further includes commanding operation of one of the drive system and the lift arm assembly based on the received input from the one of the first input device and the second input device and commanding the engine to operate at the desired engine operating speed.

In still another embodiment, a control system for controlling an engine in a power machine having a hydraulic drive system is disclosed. The control system includes a drive user input capable of being manipulated to provide a signal indicative of an intent to control the hydraulic drive system and a controller for providing a control signal to control an engine operating speed. The controller is in communication with the drive user input to receive the signal from the drive user input and is configured to determine a desired engine operating speed by determining a baseline engine operating speed and calculating an offset based at least in part on the signal from the user input and provide a control signal to the engine based on the determined desired engine operating speed.

In yet another embodiment control system for controlling an engine in a power machine having a lift arm assembly is disclosed. The control system includes a lift arm user input, capable of being manipulated to provide a signal indicative of an intent to control a position of the lift arm assembly and a controller for providing a control signal to control an engine operating speed. The controller is in communication with the lift arm user input to receive the signal from the lift arm user input and being configured to determine a desired engine operating speed by determining a baseline engine operating speed and calculating an offset based at least in part on the signal from the lift arm user input and provide a control signal to the engine based on the determined desired engine operating speed.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

FIGS. 6A-6B illustrate control patterns of user inputs for use with the control system of FIG. 6.

DETAILED DESCRIPTION OF ILLUSTRATIVE EMBODIMENTS

The concepts disclosed in this discussion are described and illustrated by referring to illustrative embodiments. These concepts, however, are not limited in their application to the details of construction and the arrangement of components in the illustrative embodiments and are capable of being practiced or being carried out in various other ways. The terminology in this document is used to describe illustrative embodiments and should not be regarded as limiting. Words such as "including," "comprising," and "having" and variations thereof as used herein are meant to encompass the items listed thereafter, equivalents thereof, as well as additional items.

In accordance with some exemplary embodiments, the present disclosure provides systems and methods of automatically controlling engine operating speed (also referred to as "engine speed") in a power machine based upon the user input controls which control other power machine functions such as travel functions, lift functions, tilt functions and auxiliary functions. While these functions are controlled with user input devices, such as a pair of joystick controllers, engine speed has conventionally been controlled completely separately using an engine throttle input device such as a foot pedal. By automatically controlling engine speed at least partially in response to the user input devices controlling other machine functions, more optimal engine speeds can be achieved. In some exemplary embodiments, this reduces one or more of engine fuel consumption, engine wear, required engine maintenance frequency and noise, while also ensuring that a sufficient engine speed is maintained to perform work functions using the power machine.

Figure 2:
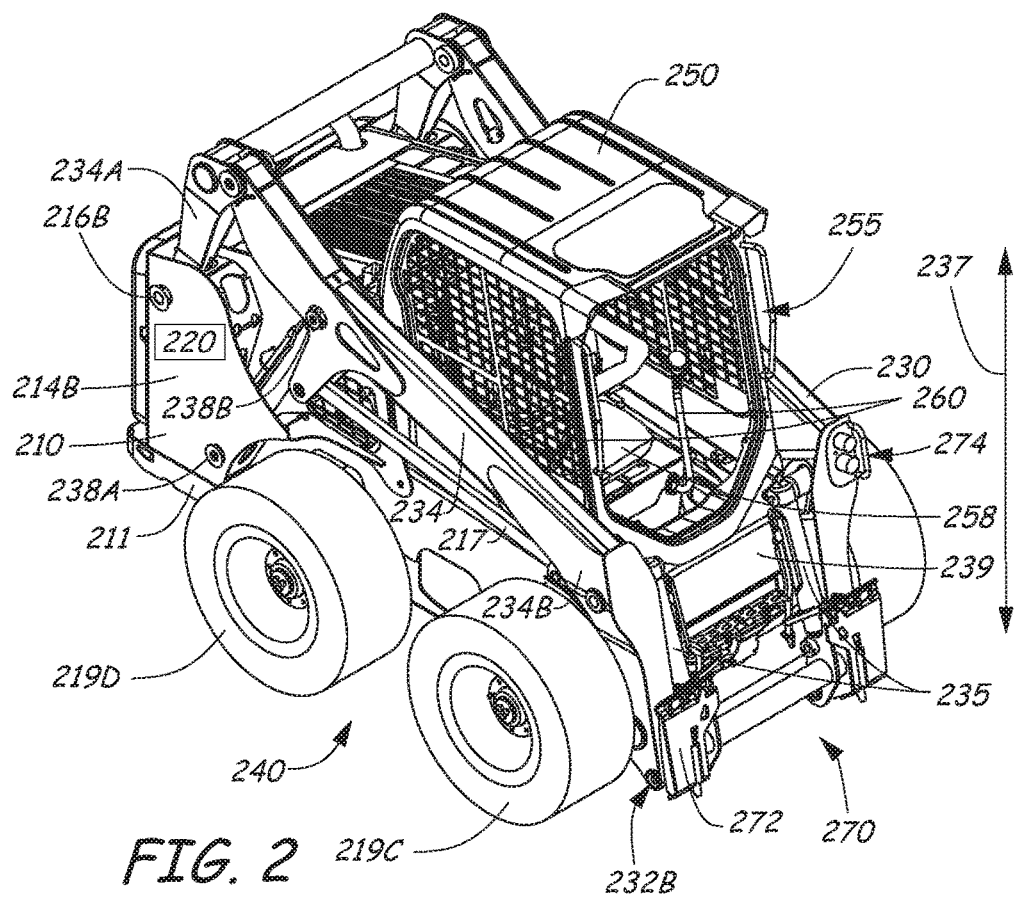
FIGS. 2-3 illustrate perspective views of a representative power machine in the form of a skid-steer loader of the type on which the disclosed embodiments can be practiced.
Figure 3:
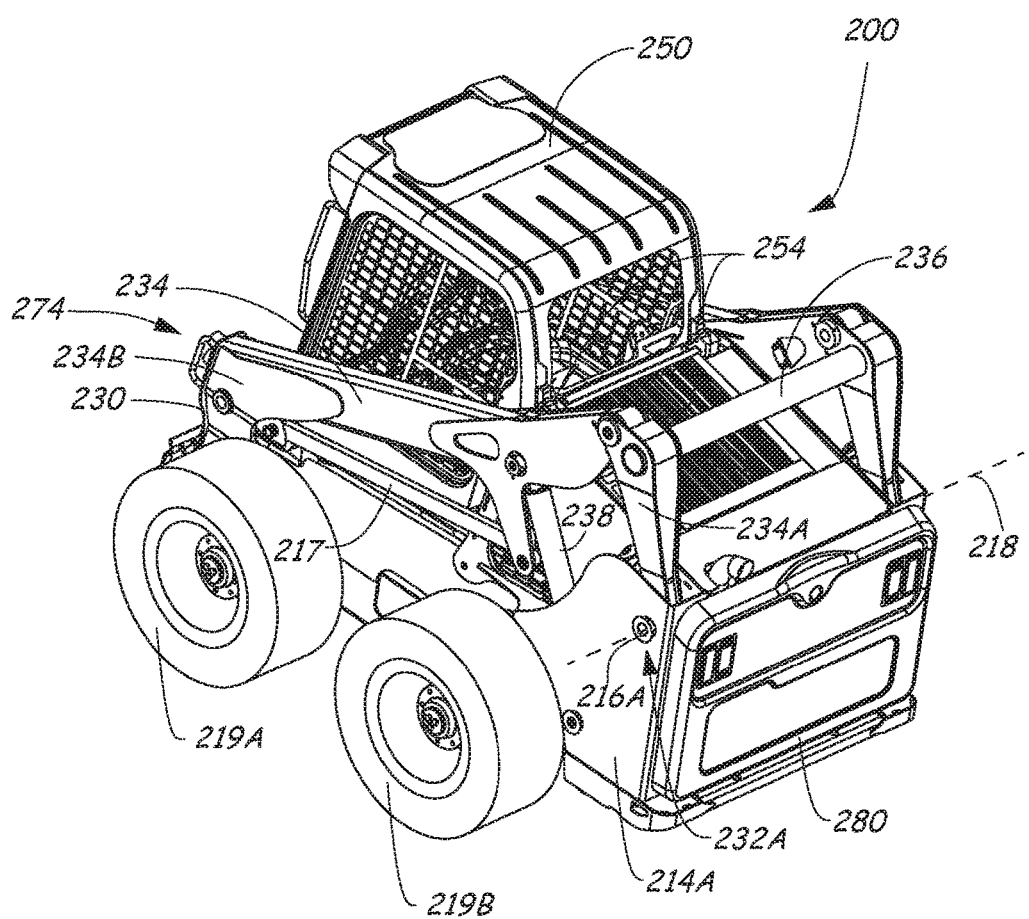

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3.

Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
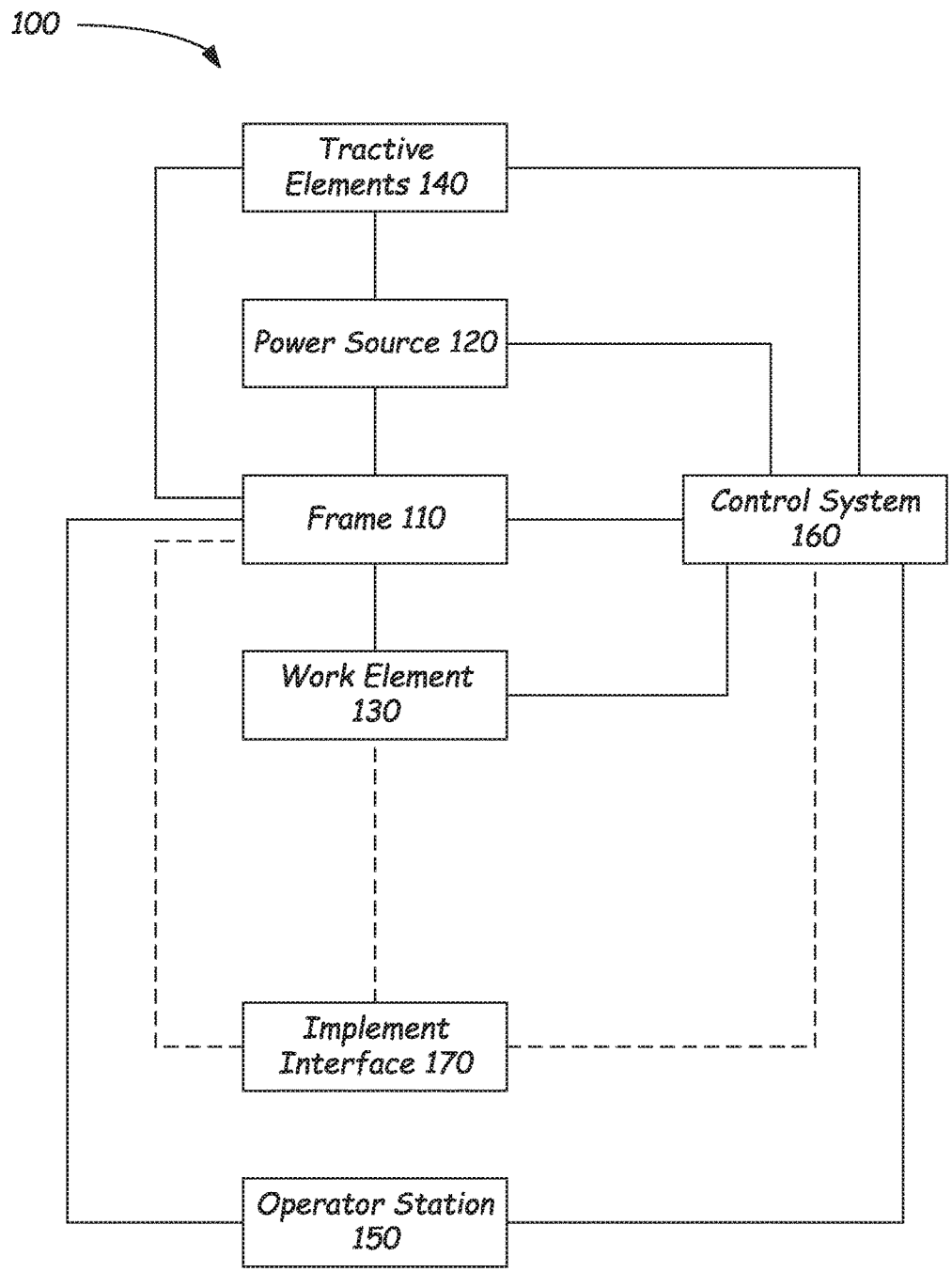
FIG. 1 is a block diagram illustrating functional systems of a representative power machine on which embodiments of the present disclosure can be advantageously practiced.

FIG. 1 is a block diagram that illustrates the basic systems of a power machine 100, which can be any of several different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement for performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion (so-called articulated frames) for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 has an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, even if they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator controlled functions on the power machine.

FIGS. 2-3 illustrate a loader 200, which is one example of the power machine 100 illustrated in FIG. 1 where the embodiments discussed below can be advantageously employed. As loader 200 is one example of the power machine 100, features of loader 200 described below include reference numbers that are generally similar to those used in FIG. 1. For example, loader 200 is described as having a frame 210, just as power machine 100 has a frame 110. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to move the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be considered as limiting the scope of the discussion to those loaders with wheels as tractive elements.

The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that is capable of generating or otherwise providing power for operating various functions on the power machine. Power system 220 is shown in block diagram form, but is located within the frame 210. Frame 210 also supports a work element in the form of a lift arm assembly 230 that is powered by the power system 220 for performing various work tasks. As loader 200 is a work vehicle, frame 210 also supports a traction system 240, powered by power system 220, for propelling the power machine over a support surface. The power system 220 is accessible from the rear of the machine. A tailgate 280 covers an opening (not shown) that allows access to the power system 220 when the tailgate is an opened position. The lift arm assembly 230 in turn supports an implement interface 270 that provides attachment structures for coupling implements to the lift arm assembly.

The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair. The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that include and/or interact with the embodiments discussed below can have various frame components that support various work elements. The elements of frame 210 discussed herein are provided for illustrative purposes and frame 210 is not necessarily the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports tractive elements in the form of wheels 219A-D (collectively, 219) on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

Implement interface 270 is located proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as skid-steer loader 200, unless otherwise noted or recited, the concepts discussed below are not intended to be limited in their application to the environments specifically described above.

Figure 4:
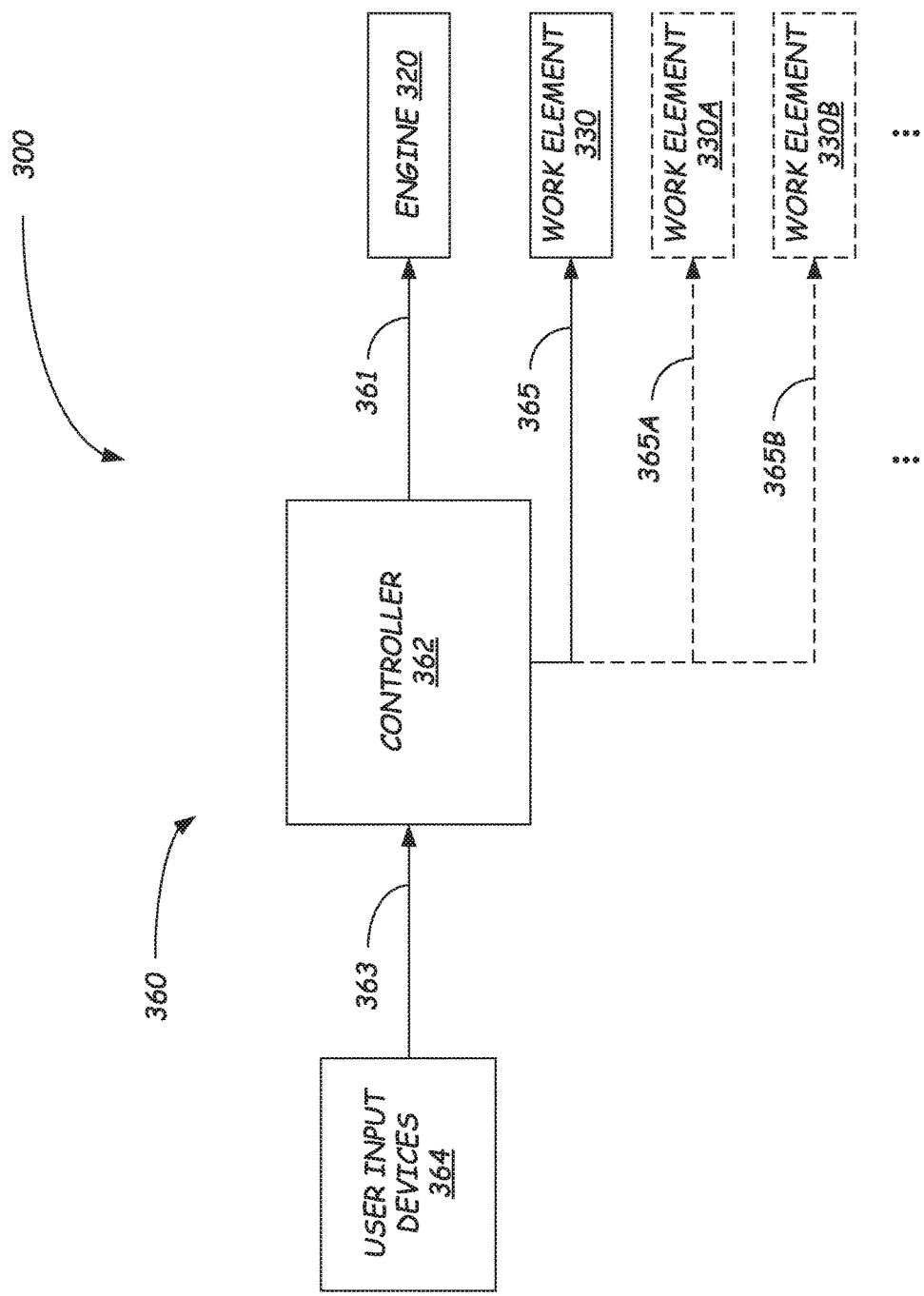
FIG. 4 is a block diagram illustrating a control system for controlling an engine operating speed on a power machine according to one illustrative embodiment.

FIG. 4 illustrates a simplified block diagram of a power machine 300 according to one illustrative embodiment. Power machine 300 includes a power source in the form of an engine 320. A control system 360 includes a controller 362 and one or more user input devices 364, which are in communication with the controller 362. A communication path 363 is shown between the user input devices 364 and the controller 362. The user inputs 364 can include various user manipulable devices, each of which is capable of communicating a signal to the controller 362 indicative of whether and how it is being manipulated. Signals from the user input are shown as travelling in one direction along communication path 363 from the user input devices to the controller 362 for simplicity's sake. In various embodiments, a two-way communication path can exist between the controller 362 and any number of the user input devices 364. In addition, communication between the user input devices 364 and the controller 362 can be accomplished in various ways, including, without limitation, analog electrical signals and wired or wireless digital communication signals. In some embodiments, some of the user input devices can communicate to a controller in different forms than other user input devices on the same power machine.

Controller 362 is also in communication with engine 320 and a work element 330. In some embodiments, the controller 362 communicates with a plurality of work elements, including work element 330A, work element 330B and so forth. Control signal 361 illustrates communication between the controller 362 and the engine 320. Control signals 365, 365A, and 365B illustrate communication between the controller 362 and work elements 330, 330A, and 330B. All the control signals are shown as one-way communication, but in various embodiments, communication between the controller, engine, and any work element can be two-way communication.

Actuation of work element 330 is performed in response to control signals 365 provided to the controller 362. In turn, controller 362 provides the control signals 365 to work element 330 at least in part in response to signals provided from one or more of the user input devices 364. In addition, controller 362 provides control signal 361 to engine 320 to regulate the engine speed of the engine at least in part in response to the same signals provided to the controller from the user input devices used to control work element 330.

Figure 5:
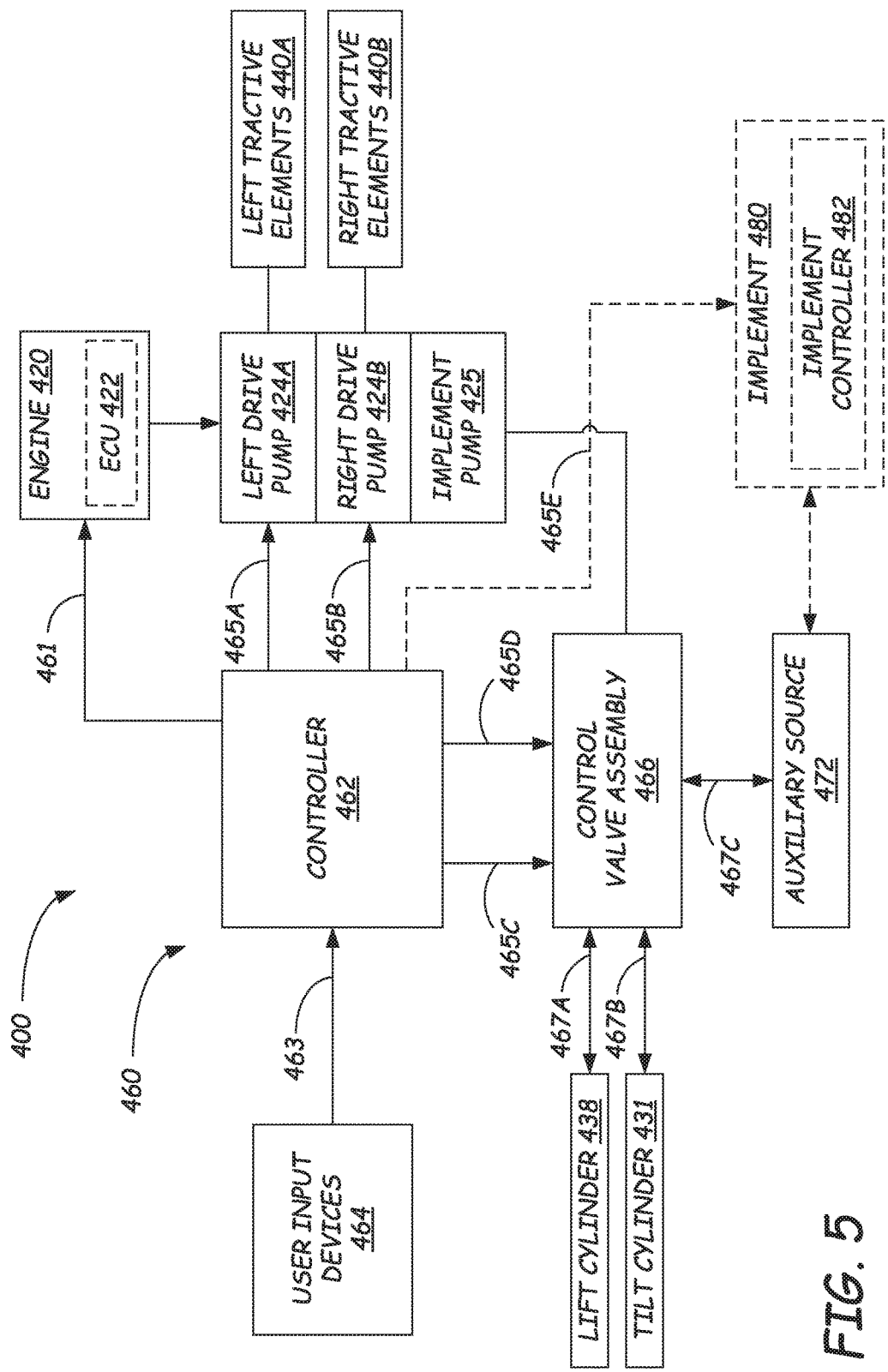
FIG. 5 is a block diagram illustrating a power machine, including a control system for controlling a speed of an engine on the power machine in accordance with some illustrative embodiments.

FIG. 5 illustrates an embodiment of power machine 400 with a control system 460 for controlling various work functions of the power machine. Control system 460 includes a controller 462 that receives signals (collectively, 463) from one or more user input devices 464 and, responsive to at least one or more signals from the user input devices, provides control signals (collectively 465) to control operation of various work elements of the power machine. The work elements controlled by the controller 462 illustratively include lift and tilt cylinders 438 and 431, and left and right tractive elements 440A and 440B. In addition, the controller 462 controls the selective provision of pressurized fluid at an auxiliary source 472. In the embodiment shown in FIG. 5, control of the lift and tilt functions is accomplished by providing control signals 465C for selectively actuating a control valve assembly 466 to provide pressurized fluid to the lift and tilt cylinders 438 and 431, respectively. Control of left and tractive elements 440A and 440B to control machine travel direction (i.e. forward or reverse), steering, and speed is accomplished by providing control signals 465A and 465B to left and right drive pumps 424A and 424B. Control of the provision of pressurized fluid to the auxiliary source 472 is accomplished by providing control signals 465D to the control valve assembly. Auxiliary source 472 is capable of being coupled to a plurality of different kinds of implements to control one or more actuation devices such as motors, cylinders, and the like on such implements. In addition, as will be described further below, controller 462 is configured to provide signals 461 to the engine to control the speed of engine 420 based at least in part upon one or more of the signals 463 provided to the controller 462.

Engine 420 can include, in some embodiments, an engine control unit (ECU) 422 configured to communicate with controller 462 and to receive control signal 461 to control the engine speed from the controller. The ECU 422 then responsively controls the speed of engine 420. Engine 420 drives the left drive pump 424A, right drive pump 424B and an implement pump 425, which can be a constant displacement pump such as a gear pump as shown or a variable displacement pump, provides pressurized hydraulic fluid to control valve assembly 466. Left drive pump 424A illustratively powers one or more left side tractive elements 440A by, for example, selectively providing pressurized hydraulic fluid to a bidirectional left drive motor (not shown). Similarly, right drive pump 440B powers one or more right side tractive elements 440B of the power machine by selectively providing pressurized hydraulic fluid to a similar bidirectional right drive motor (not shown).

Control valve assembly 466, in some embodiments, is an open center multiple spool valve arrangement (not shown), with the position of the spools being controlled, at least in part, by actuators that can control signals 465C and 465D and responsively shifting the spools to provide hydraulic flow via conduits 467A, 467B, and 467C to the lift cylinder 438, the tilt cylinder 431, and the auxiliary source 472, respectively. In other embodiments, various configurations of hydraulic components are provided to selectively control the flow of hydraulic fluid to actuators that control work elements.

As shown in FIG. 5, power machine 400 is capable of being operably coupled to an implement 480. Some implements such as implement 480 are configured to be coupled to the auxiliary source 472 so as to selectively receive pressurized hydraulic fluid from the power machine 400. Implement 480 has an implement controller 482 mounted thereon that is capable of receiving control signals 465E from controller 462. Communication is shown in FIG. 5 as being one-way, i.e. controller 462 communicates to implement controller 482, but in some embodiments, that communication is two-way. Furthermore, in some embodiments, implement controller 482 can send control signals to the controller 462, which will cause the controller 462 to provide control signals 465D to the control valve assembly 466, which will cause pressurized hydraulic fluid to be available at the auxiliary source. Other implements may not have an implement controller such as implement controller 482.

Figure 6:
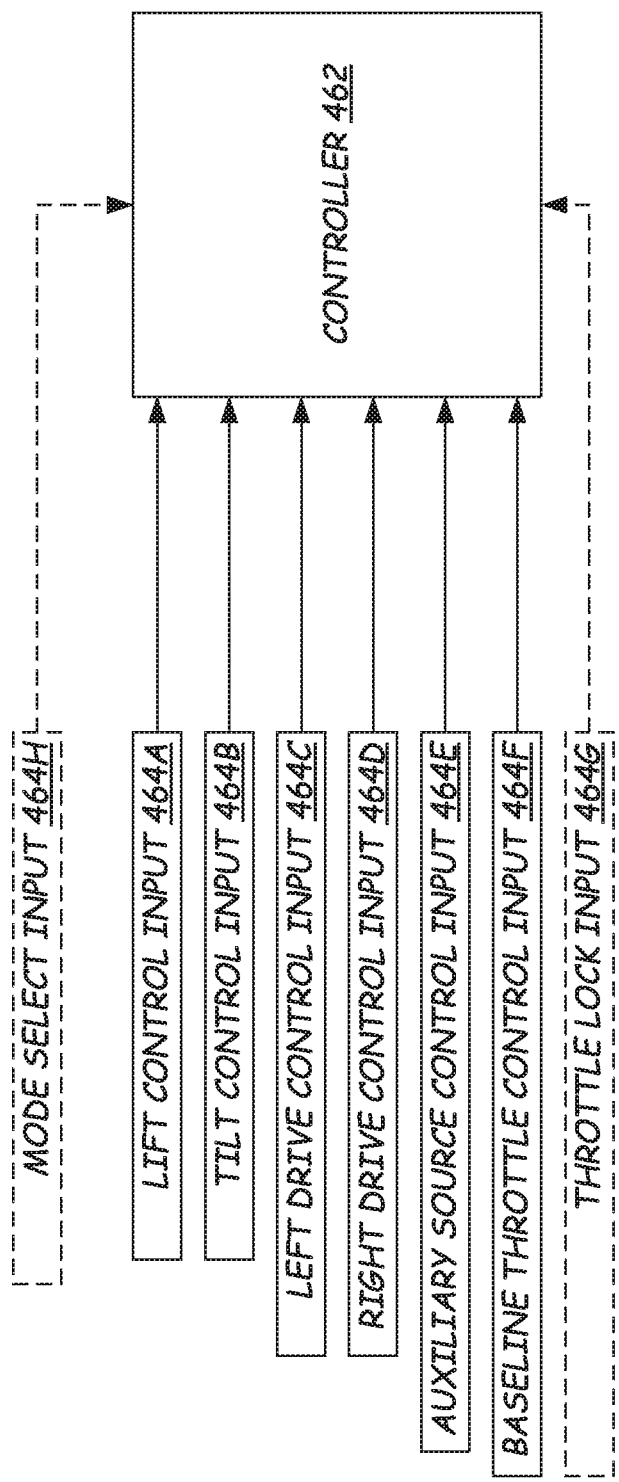
FIG. 6 is a block diagram illustrating a more particular example of the control system shown in FIG. 5 in accordance with some illustrative embodiments.

In some exemplary embodiments, user inputs 464 are representative of inputs that control lift cylinder 438, tilt cylinder 431, and the presence of pressurized hydraulic flow at the auxiliary source 472, as well as a throttle control input which can be used to set a baseline engine speed. Referring for the moment to FIG. 6, in some embodiments, user inputs 464 include a lift control input 464A, a tilt control input 464B, a left drive control input 464C, a right drive control user input 464D, an auxiliary source control input 464E, and a baseline throttle control input 464F. Some of these user inputs, for example left and right drive control inputs 464C and 464D, can be combined into single user input devices. Auxiliary source control input 435 and baseline throttle control input 440 can be separate input devices located, for example, elsewhere in the operator compartment, or these inputs can be integrated into joysticks using thumb switches, push buttons, or other user actuable input devices.

At least some of these described user inputs can be implemented using a pair of dual axis joysticks. In one embodiment, as illustrated in FIG. 6A, left joystick 469A and right joystick 469B (collectively, 469) are configured to operate using a joystick control pattern referred to as an "ISO pattern." In the ISO pattern, the left joystick 469A has a first axis, the fore/aft axis, which is manipulable to control the speed and direction (i.e. forward or reverse) of travel. The side-to-side axis controls turning left and right and the severity of the turn. Combined, the joystick sends a pair of signals to the controller 462 that are interpreted by the controller 462 to control the left and right drive pumps. The right joystick 469B controls lift and tilt functions as shown and described in FIG. 6A. FIG. 6B illustrates a control pattern known as the "H-pattern", which is used in other embodiments. In the H-pattern, left joystick 469A' is manipulable to provide input signals for controlling the left drive pump and the lift cylinder while the right joystick 469B' is manipulable to provide input signals for controlling the right drive pump and the tilt cylinder.

In addition to generating control signals for controlling lift and tilt cylinders 438 and 431, left and right drive pumps 424A and 424B, and auxiliary functions, controller 462 is configured to generate control signals for controlling the speed of engine 420 based at least in part upon the same user inputs used to control one or more of these other work elements. For example, when using joystick controller 469A to provide control signals to control left and right drive pumps 424A and 424B, controller 462 can sense, based upon the degree of actuation of the joystick, an appropriate engine speed at which the power machine can operate efficiently. The controller 462 can then provide control signals to adjust the engine speed accordingly to optimize performance. Similarly, when actuating the lift or tilt cylinders 438 and 431, controller 462 may increase the engine speed to ensure that sufficient power is available to implement the task.

Controller 462 can be configured to utilize various techniques for controlling engine speed. For example, in some embodiments, engine speed is set based upon the user input (i.e. the baseline throttle control input) and the work element (i.e. travel, lift and tilt elements, hydraulic functions on an operably coupled implement) in need of the highest engine torque to perform the function. If the lift and tilt are not commanding actuation of the lift and tilt cylinders, but the left and right drive inputs are commanding the drive pumps to achieve movement of the power machine at a high speed or rate of acceleration, the controller can control engine speed based upon the need of the drive pumps. In the alternative, if the lift and/or tilt inputs are commanding actuation of the lift and/or tilt cylinders, but the power machine is not travelling or is travelling in response to a low commanded signal for the drive pumps, the controller 462 can control engine speed based on the lift and/or tilt inputs. Controller 462 is also configured, in some embodiments, to control engine speed based upon particular combinations of user inputs.

In some embodiments, a baseline throttle input device 440 is included in user inputs 320. Baseline throttle input device 440 is configured to be actuated by the power machine operator to provide a signal indicative of a desired baseline or minimum engine speed below which the engine is not intended to fall during operation. Controller 462 stores the baseline engine and controls the engine to maintain engine speed at or above the baseline engine speed. Based on joystick user inputs as described above, controller 462 then controls engine speed to deviate upward from the baseline engine speed, in response to one or more user input devices used to control machine functions, but does not allow engine speed to fall below the baseline. In some embodiments, any actuation of a user input device 464 that is indicative of an intention to control a work element will increase the engine speed from the baseline engine speed. In other embodiments, actuation of only certain user input devices will result in the controller increasing the engine speed. For example, a user input device may have to be actuated a certain amount (e.g., 50% of maximum) to increase the engine speed from the baseline engine speed. In other embodiments, certain predetermined combinations of user input device actuations have to be received (e.g., some combination of travel speed, lift cylinder actuation, tilt cylinder actuation, auxiliary function activation, etc.) to cause the controller to increase engine speed.

In some embodiments, the baseline engine speed can be set based upon the particular implement type attached to the power machine. For example, when coupled with an implement having an implement controller, the implement controller may be able communicate identifying or load information to controller 462 to aid in setting a baseline engine speed of the engine for optimal use of that particular implement. In other embodiments, implements can have identifying tags such as RF ID tags or other types of identifying tags or identification mechanisms or systems that can inform the controller 462 as to what type of implement is operably coupled to the power machine. In some embodiments, information from the implement controller identifying the implement type or providing information about a work load on the implement can also be used to control the amount of deviation from the baseline engine speed that will be commanded in response to actuation of user inputs.

In another exemplary embodiment, control system 460 is configured to allow a baseline engine speed to be set by a user based on the engine speed during a particular work function. For example, with user input devices actuated to drive the power machine forward at an engine speed that the operator finds preferable or optimal, a user input device such as a push button or other throttle lock input 464G can be actuated to lock the current engine speed in as the baseline engine speed. Then, even when the actuated user input devices are released and allowed to return to a neutral position, the engine speed is maintained at the selected engine speed until the user overrides the RPM lock such as, for example, re-actuating throttle lock input 464G. This differs from some embodiments in that, rather than setting a particular baseline engine speed based on knowledge of the operator, information from an implement controller, etc., the optimal engine speed can be established by operating the machine and, when operating in a desired manner, actuating the input 464G to lock in the engine speed of the engine at that time as the baseline engine speed. It should be understood that the engine speed at that time may be selected as a function of a previously selected baseline and any work elements that may be operated at the time that the throttle lock input 464G is actuated.

In yet other embodiments, a mode select input 464H can be included to allow a user and/or an owner of a machine to select a mode of engine speed control. For example, because inexperienced power machine operators sometimes operate the machine by setting the throttle to a very high engine speed level and then maintain the high engine speed even when not needed, in some embodiments, a machine owner can use mode select input 464H to signal to the controller to selectively place the machine in a mode where the baseline throttle cannot be increased above a preset baseline throttle. In other words, in some embodiments, the baseline throttle adjustment can be turned off. For example, in this mode, the baseline RPM can be an idle level of the engine, and any upward deviation of engine RPM from the non-adjustable baseline is achieved by manipulation of the joysticks. After the joysticks are returned to neutral positions, the engine RPM returns to the non-adjustable baseline. These and other control methods can be implemented in systems such as control system 460 discussed above.

Figure 7:
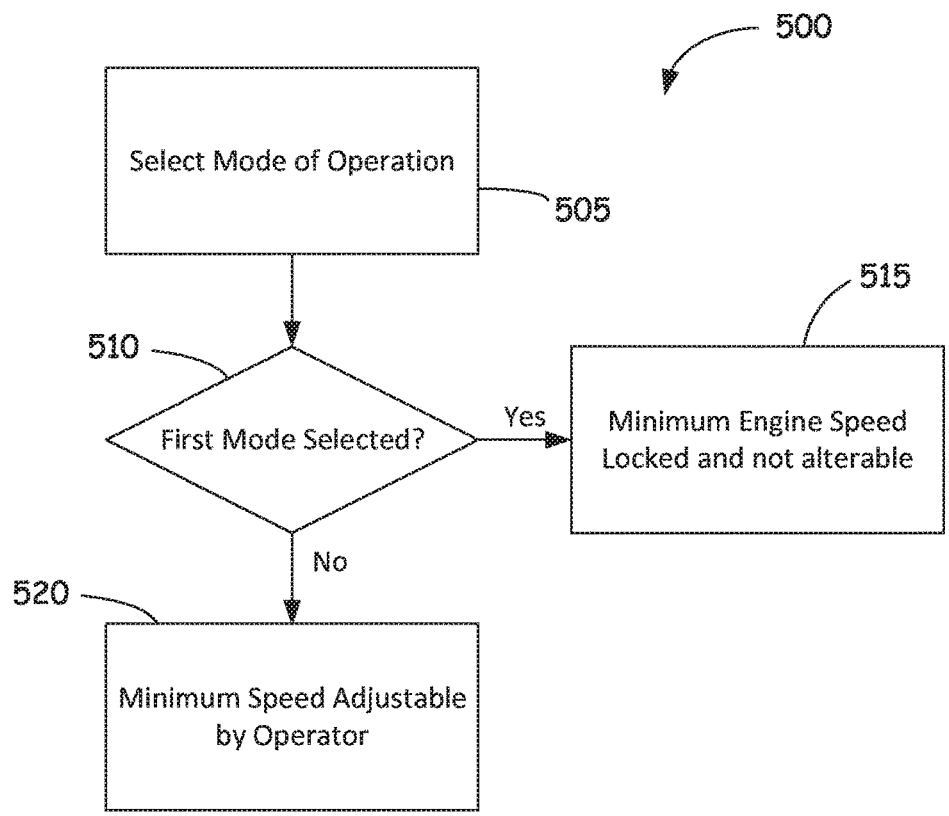
FIGS. 7-12 are methods of controlling engine operating speed in accordance with some illustrative embodiments.

FIG. 7 illustrates a flow diagram of a method 500 for configuring controller 462 to operate in different operational modes of controlling engine speed. Specifically, method 500 illustrates how the control system 460 will allow or not allow a baseline engine speed that is adjustable by an operator. At block 505, a mode of operation is selected. For example, mode select input 464H can be used in some embodiments to select between multiple modes of operation. At block 510, the controller determines whether a first mode of operation has been selected. If the first mode of operation has been selected, then at block 515, the baseline or minimum engine speed is locked and is not alterable by the operator. This mode of operation is useful, for example as described above, to owners of the power machine who want to prevent inexperienced operators from setting the baseline engine speed too high.

If, at block 510, the first mode of operation has not been selected, then at block 520 a determination can be made as to whether a second mode of operation has been selected. If the second mode of operation has been selected, then at block 525 the baseline or minimum engine speed can be adjusted by the machine operator, for example using one or more of the techniques described above, including in response to actuation of baseline throttle control input 464F. In either of the first and second modes, the engine speed can be varied from the baseline based upon actuation of the user inputs as described above.

Figure 8:
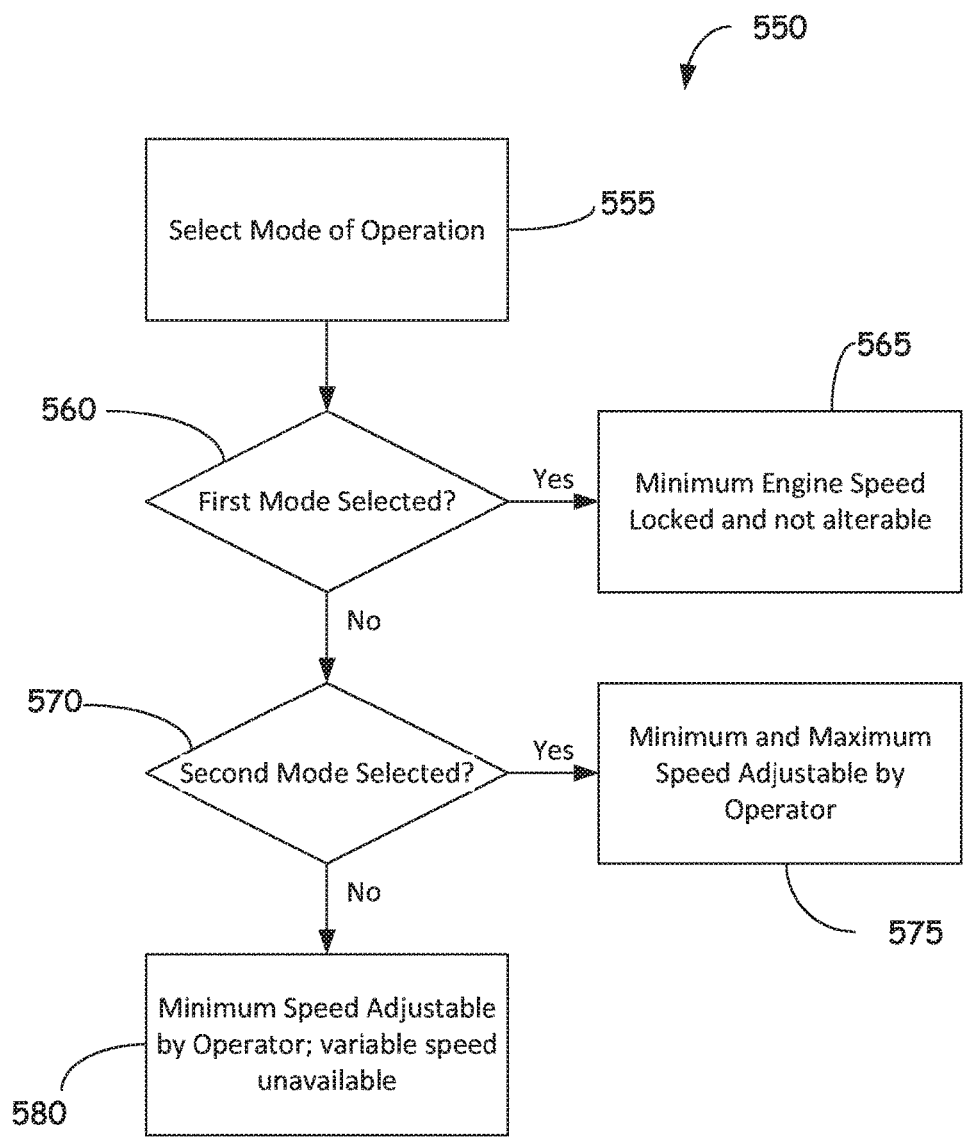

FIG. 8 illustrates a flow diagram of a method 550 for configuring controller 462 to operate in different operational modes of controlling engine speed according to another illustrative embodiment. At block 555, a mode of operation is selected and at block 560, it is determined whether the first mode of operation has been selected. If the first mode of operation has been selected, then the baseline or minimum engine speed is locked and is not alterable by the operator as shown at block 565. However, the engine speed can be varied from the baseline based upon actuation of the user inputs as described above.

If at block 560, however, it is determined that the first mode is not selected, the method moves to block 570, where the method determines whether a second mode is selected. If the second mode is selected, the method moves to block 575, in which the method allows the minimum and maximum speed to be adjustable via the user input devices 364 and 464 as are shown in FIGS. 4-6. In some embodiments, actuation of the user input devices 364 and 464 changes the minimum and maximum speed a pre-determined amount. In other embodiments, actuation of the user input device 364 changes the minimum or baseline operating engine speed to the current engine operating speed. If it is determined at block 560 it is determined that the second mode was not selected, the method moves to block 580, where the minimum engine speed is adjustable by the operator, but the engine speed is not variable in response to user input devices that are used to control work elements on the power machine.

Figure 9:
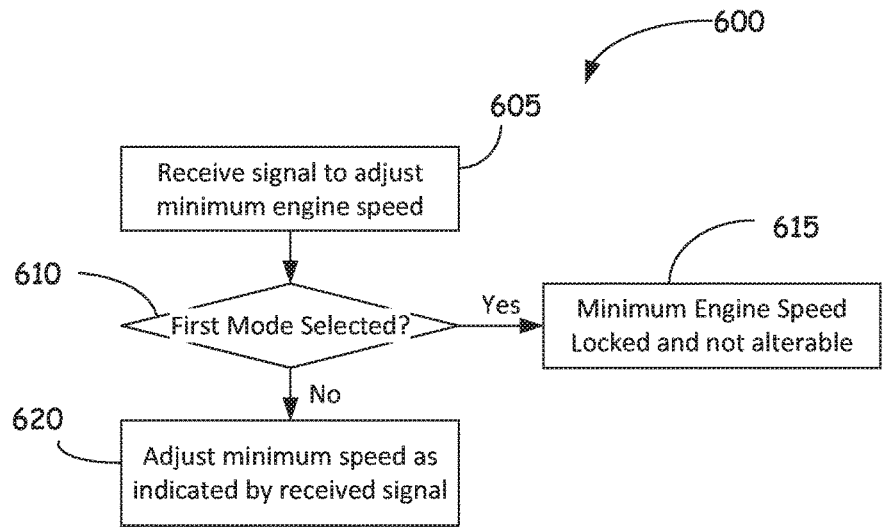

FIG. 9 includes a flow diagram illustrating a method 600 of adjusting the baseline or minimum engine speed in accordance with some embodiments. At block 605, a signal is received indicative of an intended adjustment of the minimum engine speed. For example, the signal can be received from a throttle set input device 440. At block 610 it is determined whether the first mode of operation has been selected. As discussed above, in the first mode of operation the baseline or minimum engine speed is locked and not alterable. Therefore, if it is determined that the first mode of operation has been selected, the method proceeds to block 615 and the minimum engine speed is not changed in response to the received signal. However, if it is determined at block 610 that the first mode of operation has not been selected, the minimum engine speed is adjusted in block 620 as indicated by the received signal, since both of the second and third modes of operation discussed above allow the operator to adjust the baseline or minimum engine speed. It should be understood that the flow diagrams discussed above relative to mode selection are illustrative. In various embodiments, input handling of a signal from mode select input 464H can be implemented in a variety of ways, and modes may be numbered differently in other embodiments.

Figure 10:
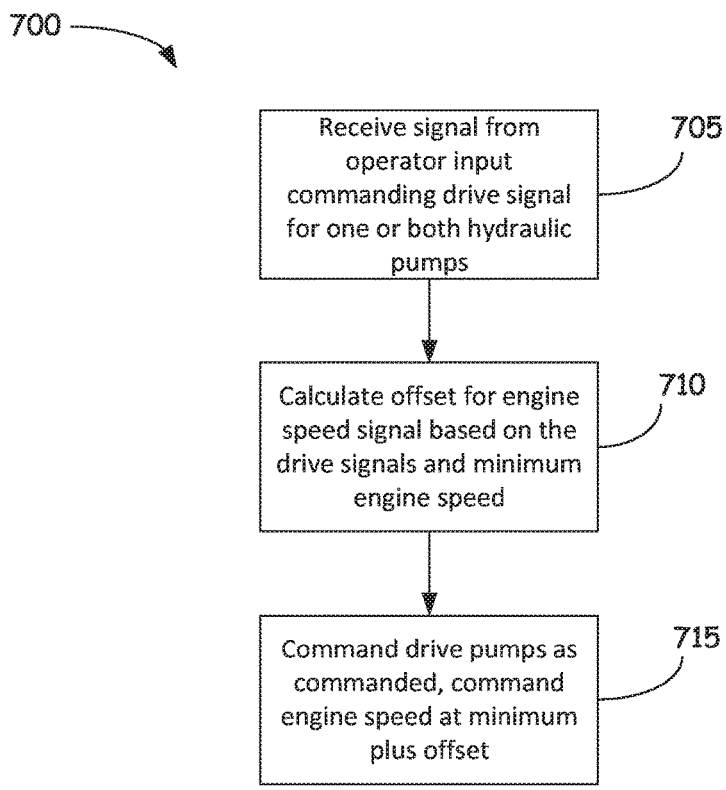

Referring now to FIG. 10, shown is a flow diagram illustrating a method 700 of controlling a power machine during a travel operation in accordance with an exemplary embodiment. At block 705 of method 700, a signal is received from an operator input device commanding a drive signal for one or both of hydraulic drive pumps 424A and 424B345. In an exemplary embodiment in which joysticks 469 are configured in an ISO control pattern, the signal can be received by controller 462 from left joystick 469A. In other embodiments, the signal can be received from right joystick 469B or can be a signal representative of output signals from both of joysticks 469. In other words, the received signal commanding a drive signal can be two separate signals from the two joystick user inputs. The drive control signal includes both a propulsion signal component or aspect and a steering signal component or aspect, as well as signal components or aspects controlling forward and reverse travel.

At block 710, an engine speed offset is calculated or determined based on the received signal(s) and/or the corresponding commanded drive control signal. The engine speed offset and the baseline engine speed are together indicative of the engine speed determined by the drive control signal. Controller 462 sets the engine speed, as determined by the engine speed offset, to provide optimal torque to drive the pumps at the pump stroke that is commanded. Acceleration of engine speed is selected to provide a smooth transition between the baseline engine speed and the set engine speed. At block 715, the drive pumps 424A and 424B are commanded in accordance with the signal(s) received from the joystick user input(s), and the engine speed is commanded to be the baseline or minimum engine speed plus the calculated offset.

Figure 11:
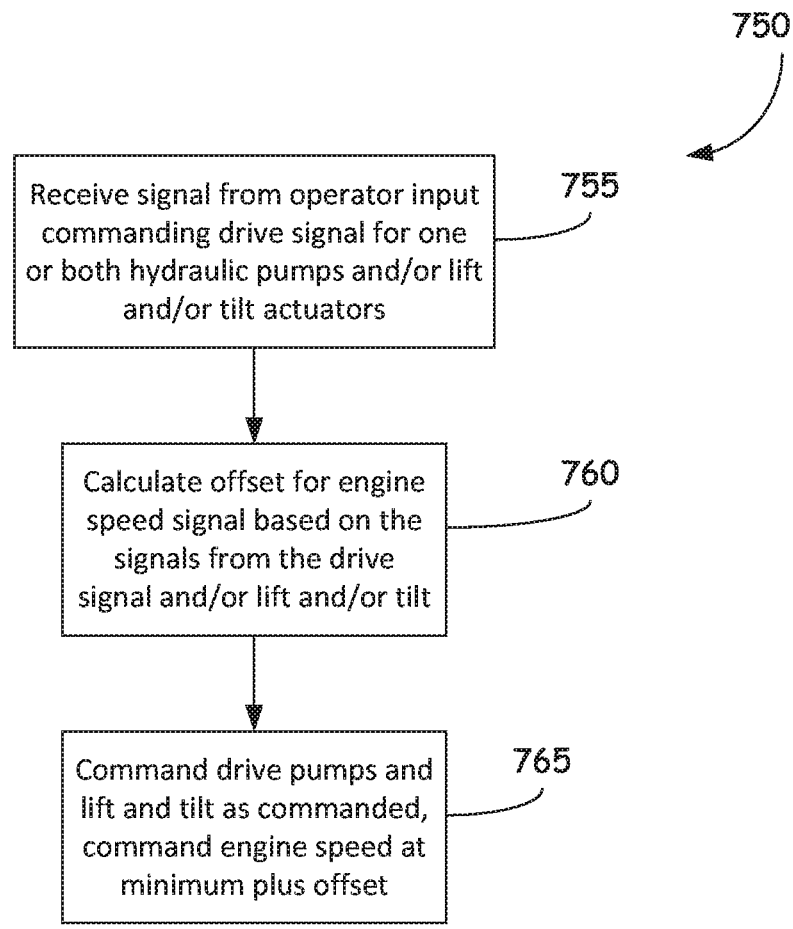

Referring now to FIG. 11, shown is a flow diagram illustrating a method 750 of controlling a power machine during either or both of a travel operation and a lift and/or tilt operation in accordance with an exemplary embodiment. At block 755, a signal is received from one or more operator input devices commanding a drive signal for one or both of hydraulic drive pumps 424A and 424B and/or commanding actuation of one or both of lift and tilt actuators 438 and 431. As discussed above, in some embodiments the received signal can be a combination of signals from multiple operator input devices, such as from both of joystick user inputs 469, or the received signal can be multiple separate signals from multiple operator input devices.

At block 760, an engine speed offset is calculated or determined based on the received signal(s) and/or the corresponding commanded drive control signal, lift cylinder control signal and/or tilt cylinder control signal. The engine speed offset and the baseline engine speed are together indicative of the engine speed determined by controller 462 based upon the received signal(s). Controller 462 sets the engine speed, as determined by the engine speed offset, to provide optimal torque to drive the drive pumps 424A and 424B at the pump stroke that is commanded and/or to provide optimal torque to the implement pump 425 to provide hydraulic fluid under pressure to the lift and/or tilt cylinders. In some embodiments, calculation of the engine speed offset, or alternatively of the desired engine speed, is based on the maximum engine speed signal calculated or needed for the drive function, the lift function, and the tilt function. In other words, the highest of the optimal engine speeds for each of these individual functions is selected as the desired engine speed for calculating the engine speed offset. In some alternative embodiments, the selected desired engine speed is determined as an additive function of the lift, tilt and drive signals. At block 765, the drive pumps 424A and 424B and lift and tilt cylinders 438 and 431 are commanded in accordance with the signal(s) received from the joystick user input(s), and the engine speed is commanded to be the baseline or minimum engine speed plus the calculated offset.

Figure 12:
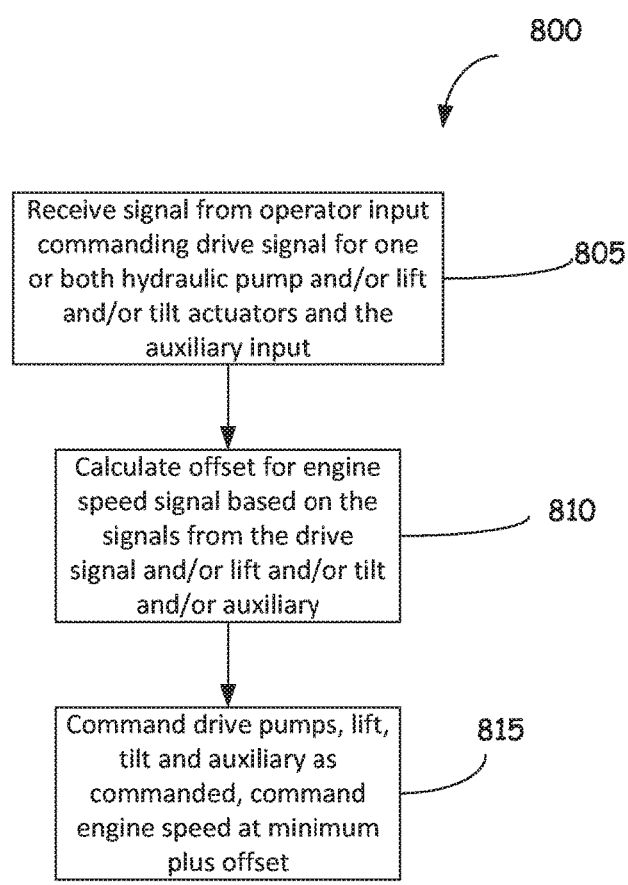

Referring now to FIG. 12, shown is a flow diagram illustrating a method 800 of controlling a power machine during any or all of a travel operation, a lift and/or tilt operation, and an auxiliary function operation in accordance with an exemplary embodiment. At block 805, a signal is received from one or more operator input devices commanding a drive signal for one or both of hydraulic drive pumps 424A and 424B, commanding actuation of one or both of lift and tilt actuators 438 and 431, and/or commanding an auxiliary function such as a function on an attached implement 480 requiring pressurized hydraulic fluid from the power machine. As discussed above, in some embodiments the received signal can be a combination of signals from multiple operator input devices, such as from both of joystick user inputs 469 and/or from auxiliary source control input 464E, or the received signal can be multiple separate signals from multiple operator input devices.

At block 810, an engine speed offset is calculated or determined based on the received signal(s) and/or the corresponding commanded drive control signal, lift cylinder control signal tilt cylinder control signal, and/or auxiliary function control signal. Contribution to the engine speed offset calculation of the commanded auxiliary function can be based on the amount of hydraulic flow required for the auxiliary function, or it can be based on the type of implement attached. With an implement control 482 as described above, this type of information is available for use by controller 462 in some embodiments.

The engine speed offset and the baseline engine speed are together indicative of the engine speed determined by controller 462 based upon the received signal(s). At block 810, controller 462 sets the engine speed, as determined by the engine speed offset, to provide optimal torque to drive the drive pumps 424A and 424B at the pump stroke that is commanded and/or to provide optimal torque to the implement pump 425 to provide hydraulic fluid under pressure to the lift and tilt cylinders and/or to the attached implement. In some embodiments, calculation of the engine speed offset, or alternatively of the desired engine speed, is based on the maximum engine speed signal calculated or needed for the drive function, the lift and tilt functions, and the auxiliary function. In other words, the highest of the optimal engine speeds for each of these individual functions is selected as the desired engine speed for calculating the engine speed offset. In some alternative embodiments, the selected desired engine speed is determined as an additive function of the lift, tilt, auxiliary and drive signals. At block 815, the drive pumps 424A and 424B, lift and tilt cylinders 438 and 431, and auxiliary functions are commanded in accordance with the signal(s) received from the user input(s), and the engine speed is commanded to be the baseline or minimum engine speed plus the calculated offset.

Although the present invention has been described with reference to preferred embodiments, workers skilled in the art will recognize that changes may be made in form and detail without departing from the spirit and scope of the invention. For example, the above-described methods are provided as exemplary embodiments, but those of skill in the art will understand that disclosed concepts are not limited to these particular method embodiments. Similarly, the illustrated control systems represent just a few of numerous embodiments in which the disclosed concepts can be practiced.

What is claimed is:

1. A power machine, comprising:
 a frame;
 a tractive element operably coupled to the frame;
 a work element operably coupled to the frame;
 an engine mounted to the frame, the engine providing a source of power to the tractive element and the work element; and
 a control system for controlling operation of the tractive element, work element, and engine, including:
  a first user input, capable of being manipulated to provide a signal indicative of an intent to control the tractive element;
  a second user input, capable of being manipulated to provide a signal indicative of an intent to control the work element; and
  a controller for providing a control signal to control an engine operating speed, the controller in communication with the first and second user inputs to receive the signals from the first and second user inputs and being configured to determine a desired engine operating speed by determining a baseline engine operating speed and calculating an offset based at least in part on at least one of the signal from the first user input and the signal from the second user input and provide a control signal to the engine based on the determined desired engine operating speed.

2. The power machine of claim 1 and further comprising:
 a third user input in communication with the controller and capable of being manipulated to provide a signal indicative of an intent to select a mode of operation; and wherein the controller is configured to operate in a plurality of different modes to control the engine operating speed in response to signals received from the third user input.

3. The power machine of claim 2, wherein the controller is configured to operate in one of a first mode of operation and a second mode operation to control the engine operating speed, wherein in the first mode of operation, the controller prevents adjustment of the baseline engine operating speed and in the second mode of operation controller allows adjustment of the baseline engine operating speed.

4. The power machine of claim 3 and further comprising:
a fourth user input in communication with the controller and capable of being manipulated to provide a signal indicative of an intent to adjust the baseline engine operating speed.

5. The power machine of claim 4, wherein the controller is configured to set the baseline engine operating speed to a current engine speed in response to a signal from the fourth user input.

6. The power machine of claim 1, wherein the work element is a lift arm assembly.

7. The power machine of claim 1, wherein the tractive element is controlled by a hydraulic pump, wherein the engine provides the source of power to hydraulic pump, and wherein the first user input is capable of being manipulated to provide the signal indicative of an intent to control the hydraulic pump.

8. A method of controlling operation of a power machine having an engine, a drive system including a hydraulic pump and a hydraulic motor, and a lift arm assembly, comprising:
receiving a signal from one of a first input device indicative of an intent to control the drive system to cause the power machine to drive over a support surface and a second input device indicative of an intent to control the lift arm assembly to move the lift arm assembly;
calculating an engine operating speed offset based on the received signal from the one of the first input device and the second input device and adding the engine operating speed offset to a baseline engine operating speed to establish a desired engine operating speed;
commanding operation of one of the drive system and the lift arm assembly based on the received input from the one of the first input device and the second input device; and
commanding the engine to operate at the desired engine operating speed.

9. The method of claim 8, wherein receiving the signal from one of the first input device and the second input device includes receiving a signal from the first input device and receiving a signal from the second input device, wherein calculating the offset includes based on the signals from each of the first input device and the second input device.

10. The method of claim 8 and further comprising:
receiving a signal from a mode input device; and
calculating a baseline engine operating speed based in part on the signal received from the mode input device.

11. A control system for controlling an engine in a power machine having a hydraulic drive system, comprising:
a drive user input, capable of being manipulated to provide a signal indicative of an intent to control the hydraulic drive system; and
a controller for providing a control signal to control an engine operating speed, the controller in communication with the drive user input to receive the signal from the drive user input and being configured to determine a desired engine operating speed by determining a baseline engine operating speed and calculating an offset based at least in part on the signal from the drive user input and provide a control signal to the engine based on the determined desired engine operating speed.

12. The control system of claim 11 and further comprising:
a baseline engine operating speed input, capable of being manipulated to provide a signal indicative of an intent to change the baseline engine operating speed.

13. The control system of claim 12, wherein the controller is configured to change the baseline engine speed a pre-set amount upon receiving, from the baseline engine operating speed input, the signal indicative of the intent to change the baseline engine operating speed.

14. The control system of claim 12, wherein the controller is configured to change the baseline engine speed to a current engine operating speed upon receiving, from the baseline engine operating speed input, the signal indicative of the intent to change the baseline engine operating speed.

15. A control system for controlling an engine in a power machine having a lift arm assembly, comprising:
a lift arm user input, capable of being manipulated to provide a signal indicative of an intent to control a position of the lift arm assembly; and
a controller for providing a control signal to control an engine operating speed, the controller in communication with the lift arm user input to receive the signal from the lift arm user input and being configured to determine a desired engine operating speed by determining a baseline engine operating speed and calculating an offset based at least in part on the signal from the lift arm user input and provide a control signal to the engine based on the determined desired engine operating speed.

* * * * *